United States Patent
Miller et al.

(10) Patent No.: US 7,020,596 B1
(45) Date of Patent: Mar. 28, 2006

(54) FORMING CONTOURED TORQUE CONVERTER PARTS WITH SLOTS

(75) Inventors: Randy Lee Miller, Brookville, OH (US); Thomas William Thompson, Dayton, OH (US); Alfred Balacan Victoria, Nashville, TN (US); Dean Bernard Bruewer, Fairfield, OH (US); Lawrence Jensen Budge, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 843 days.

(21) Appl. No.: 10/063,009

(22) Filed: Mar. 12, 2002

(51) Int. Cl.
*G06G 7/48* (2006.01)

(52) U.S. Cl. .............................. 703/7; 700/98

(58) Field of Classification Search .................... 703/7; 700/98, 118, 192; 29/592, 596, 609, 738; 310/217
See application file for complete search history.

(56) References Cited

U.S. PATENT DOCUMENTS

| | | | | |
|---|---|---|---|---|
| 3,570,368 A | * | 3/1971 | Clark | 409/89 |
| 4,998,430 A | * | 3/1991 | Howe | 72/335 |
| 5,043,906 A | * | 8/1991 | Jepson | 700/192 |
| 5,349,740 A | * | 9/1994 | Neuenschwander | 29/596 |
| 6,648,640 B1 | * | 11/2003 | Rubbert et al. | 433/24 |

* cited by examiner

*Primary Examiner*—Albert W. Paladini
(74) *Attorney, Agent, or Firm*—David B. Kelley; MacMillan, Sobanski & Todd

(57) ABSTRACT

A method for forming complex contoured torque converter components with slots. A two dimensional blank is developed that will allow for the piercing of slots into a torque converter component while the blank is still essentially planar, as it proceeds through a progressive die.

6 Claims, 4 Drawing Sheets

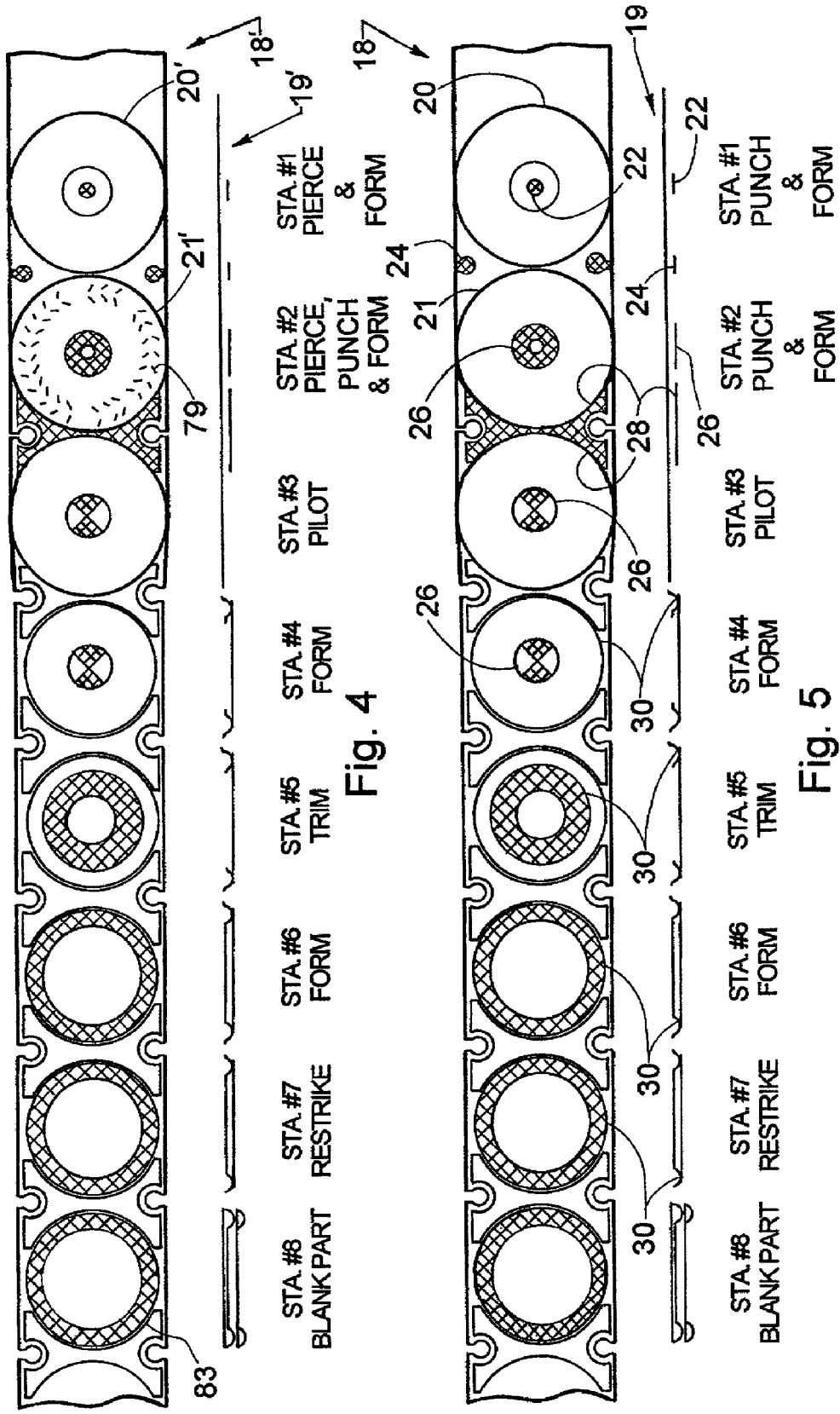

FORMING CONTOURED TORQUE CONVERTER PARTS WITH SLOTS

BACKGROUND OF INVENTION

The present invention relates to the manufacturing of torque converter components.

Torque converters typically have components with complex contours. Such components might include, for example, a turbine shroud, an impeller shroud, and a turbine shell. These parts may also include slots through their surfaces, in addition to the complex contours. The current process of making slotted shrouds and shells requires at least two operations. The first involves taking a generally flat blank and putting it through progressive dies (typically eight to eleven stations) to form the contours of the shroud or shell.

FIG. 5 illustrates a sample of progressive die tooling used to form a contoured part, with the top portion of the figure being a schematic view of the progressive die assembly 18 and operation performed at each die station, and the bottom portion illustrating the particular feature being created in the part 19 at that particular station. Station 1 illustrates the first operation, which is a punch and form operation. The first die 20 punches a center hole 22 in the part and locating holes 24. Station 2 illustrates a die 21 for forming a center contour 26 and trimming an edge 28 of the part. Station 3 illustrates additional forming of the center contour 26, and trimming a different portion of the part edge 28. Station 4 further forms a center contour 26, and starts to form a torus shaped ring 30 about the part. Station 5 illustrates a trimming operation about the edge 28 of the part. Station 6 illustrates a forming operation for deepening the torus ring 30. Station 7 re-strikes the same torus ring 30 as in station 6 to further shape the part. Station 8 illustrates the final stamping operation to produce a blank part. One will note, however, that after leaving station number 8, the part, while having all of the contours, does not have any of the slots.

A second operation is then required. The part, now with all of its contours, is then placed in a dedicated slotting machine or dedicated press to form rows of slots in the contoured part. The difficulty is that the slotting machine must be configured to cut the slots into a part that already has complex contours. These slotting machines employ dedicated indexing pierce dies to form the slots by indexing the part as it pierces one slot per row. There can be, for example, 27 slots per row. Thus, it can take a significant amount of time to form the slots in each part. Moreover, not only do these machines have very slow cycle times, they are also very expensive due to the cost of the indexing pierce dies. The indexing pierce dies for dedicated slot cutting machines can take four times longer to obtain than dies for stamping machines, and can cost as much as ten times more to manufacture as do dies for stamping machines. This second operation also adds significantly to the floor space required in a plant due to machine size and the additional machines required to meet volume capacity. Further, slotting inventory space is required to locate the inventory while awaiting the slotting process. In addition, this type of machine is mainly dedicated equipment, which requires significant time and expense to convert for a different use.

Of course, the advantage to cutting the slots after forming is that, since the part already has its complex contours, the slots can be cut to the exact shape and at the exact location desired. One cannot cut these exact desired shapes into the stock material and then run the stock through the dies because the shape of the slots will then change as the material is formed into its complex shape. They will stretch, warp and move relative to the desired position in the finished, contoured part.

Others have attempted to eliminate the requirement for a separate slotting machine operation. They have tried to pierce the slots in a progressive die, without any success, by using complex cam dies to pierce the slots in the last station of the progressive die (after the complex contours of the part have all been formed). However, complexity, die life, cost, downtime, maintenance and reliability issues associated with cam dies were significant and not very cost effective. Consequently, a separate slotting operation is still used to manufacture these components.

Thus, it is desirable to be able to form the slots into a stock material for a torque converter component such that, when formed, the slots on the finished, complex contoured part will be the desired shape and at the desired locations, without requiring an undesirable second operation to form the slots after contouring the component.

SUMMARY OF INVENTION

In its embodiments, the present invention contemplates a method for creating a two dimensional pattern that can be used to create a three dimensional part with complex contours, and slots, having predetermined shapes and locations on the part, the method comprising the steps of: (a) creating a first three dimensional computer model of the part including the contours and the slots; (b) creating a generally two dimensional computer model of the part by inputting the first three dimensional computer model into a stamping tool software; (c) creating a second three dimensional computer model of the part by inputting the generally two dimensional computer model into a transfer die software; (d) comparing at least one of the slot shapes and locations of the first three dimensional computer model to the second three dimensional computer model; (e) modifying the at least one of the slot shapes and locations in the generally two dimensional computer model if the comparison indicates differences between the compared at least one slot; and (f) repeating steps (c) through (e) until the comparison indicates substantially the same slot shapes and locations for the at least one slot in the first three dimensional computer model and the second three dimensional computer model.

The present invention further contemplates a method for forming a complex, contoured, torque converter part, having slots therein, the method comprising the steps of: creating a generally planar blank for use in forming the part; providing a progressive die assembly having at least a first station, a second station and a third station, with at least one of the stations including a die having a piercer for piercing a plurality of slots in the blank; inserting the generally planar blank, while still substantially planar, into the at least one station; and actuating the at least one station to thereby pierce a plurality of slots in the blank.

Accordingly, an object of the present invention is to pierce the desired slots into a torque converter component prior to forming the component into a complex contoured shape.

Another object of the present invention is to create a two dimensional pattern for a part, with slot locations, that after forming a blank made from this pattern into a part with complex contours will have slots that are the appropriate shapes and locations.

An advantage of the present invention is that a slotting machine, and associated indexing pierce die, that is normally required to cut slots into a complex contoured part after forming, can be eliminated.

Another advantage of the present invention is that torque converter shrouds and turbine shells can be formed with much less expense and significantly more quickly, employing less floor space in a plant for the operations, and less complexity of machinery, thus also reducing maintenance time and expenses. Further, progressive die stamping machines can be converted to form other components much more quickly and with less expense than a dedicated slotting machine.

BRIEF DESCRIPTION OF DRAWINGS

FIG. 4 is a schematic diagram of the progressive die stations in accordance with the present invention; and FIG. 5 is a schematic diagram similar to FIG. 4, but illustrating prior art progressive die stations.

DETAILED DESCRIPTION

Figure 1:
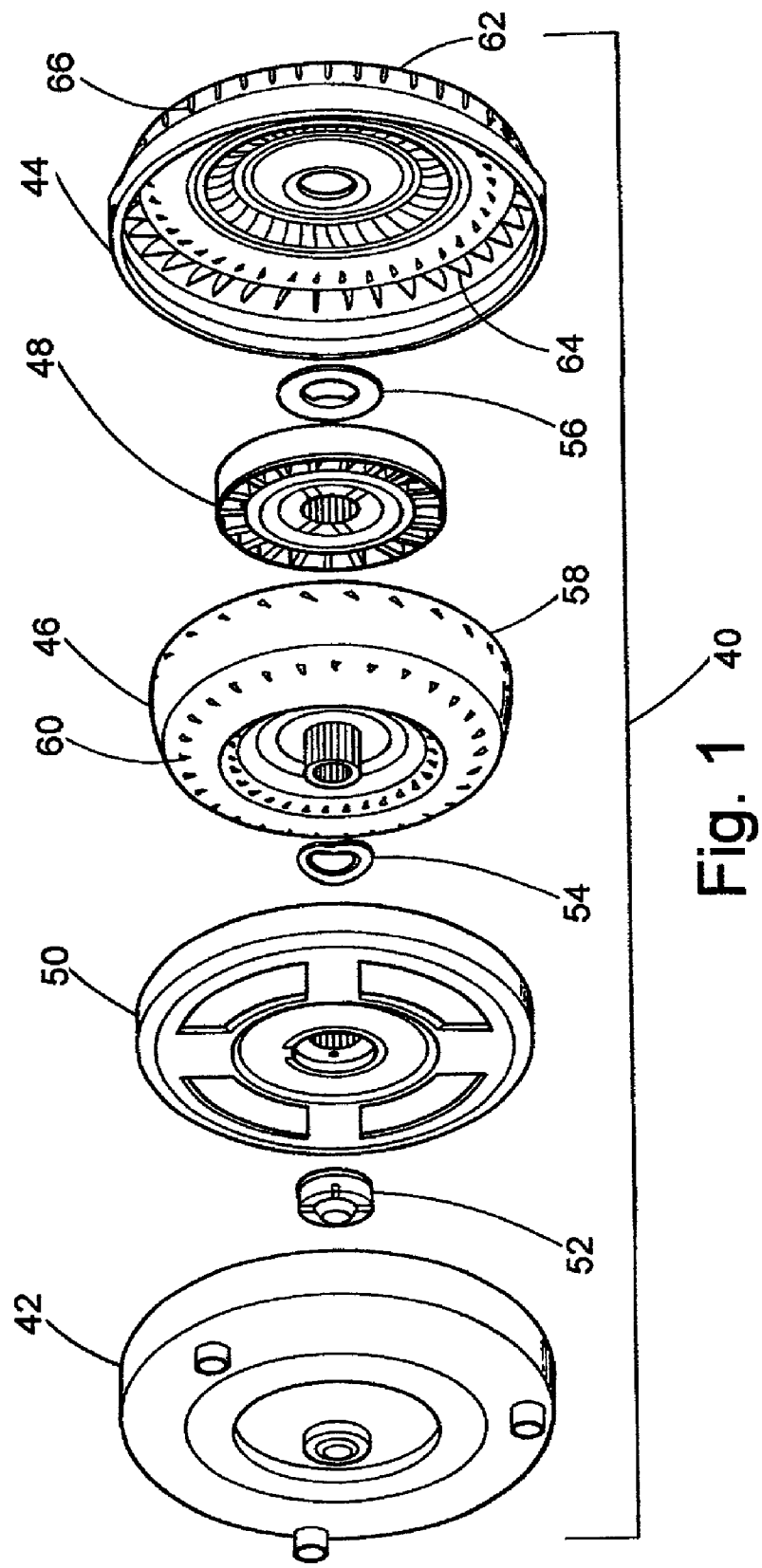
FIG. 1 is an exploded, perspective view of a typical torque converter, with some parts formed employing a method in accordance with the present invention.

FIG. 1 illustrates an exploded view of a typical torque converter 40 for an automotive vehicle (not shown). The torque converter 40 includes a converter cover assembly 42, which is driven by a crankshaft assembly (not shown), and an impeller assembly 44, affixed to and driven by the cover 42. The torque converter 40 also includes a turbine assembly 46 and a stator/one way clutch assembly 48, which are both connected to an output shaft (not shown) to a transmission (not shown). A pressure plate assembly 50, thrust spacer 52, pressure plate spring 54, and thrust bearing 56 allow the torque converter 40 to provide a lock-up function under certain driving conditions. The components of this torque converter 40 are conventional and operate in a conventional manner.

In viewing FIG. 1, one will note the complex shapes and numerous slots in some of the components. In particular, the turbine shroud 58, which forms part of the turbine assembly 46, includes a complex semi-toroidal outer shape, with fins (not shown) on its inside and slots 60 through the outer surface. Also, the impeller shroud 62, which forms part of the impeller assembly 44, includes a complex semi-toroidal shape, with fins 64 extending from its inside surface and slots 66 though its outer surface.

In the present invention, the slots 60 in the turbine shroud 58 and the slots 66 in the impeller shroud 62 are pierced early in a progressive die stamping process, prior to any significant drawing operation. This allows the slots to be cut while the material for the particular part is still relatively flat (planar), which avoids the necessity, as is the case with the prior art, of performing a separate operation which requires cutting slots into a part after complex contours are formed.

Figure 2:
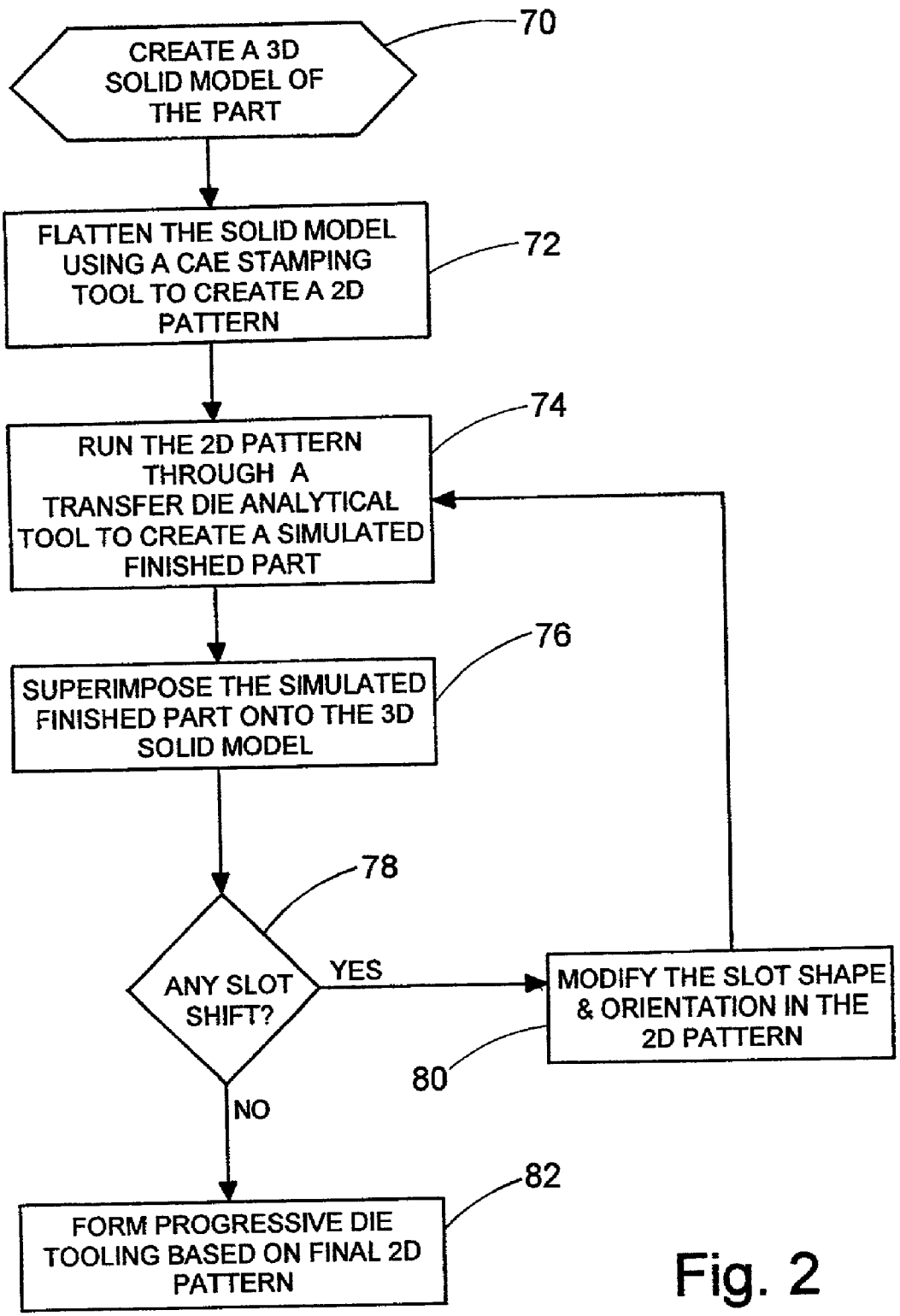
FIG. 2 is a flow chart indicating the manufacturing design process in accordance with the present invention.

FIG. 2 is a flow chart illustrating the process steps used to develop an accurate two dimensional model from which the particular torque converter part can be manufactured, (assume for this example that it is a turbine shroud 58, as illustrated in FIG. 1). The first step involves creating a 3-dimensional (3D) solid model of the turbine shroud, step 70. This step can be accomplished using any number of common Computer Aided Design (CAD) software packages available commercially, for example I-DEAS software, made by SDRC Corporation. The 3D model is created to precisely match the shape and details of the actual finished part.

Next, a Computer Aided Engineering (CAE) stamping tool software is employed to create a 2-dimensional (2D) pattern from the 3D solid model, step 72. For example, a software called PAMSTAMP, made by ESI Group can be used. PAMSTAMP is a CAE software that was created to assist in the designing of stamped parts. By using the software in a different way than it is conventionally done, one can flatten the 3D solid model of the part, with slots, to a planar state (i.e., 2D). This 2D model represents a two dimensional blank pattern, with the initial, slot shapes, locations and orientations needed prior to forming in order to produce the correct slots in the finished part.

After generating the 2D pattern, this pattern is then input to a software tool that simulates a blank being run through a progressive die (also called a transfer die) to produce a finished part, which creates a second 3D model of the turbine shroud, step 74. For example, the PAMSTAMP software, made by ESI Group, can be used.

The second 3D computer model of the finished part is then superimposed onto the original 3D solid model, and the two are compared to determine if there are any slots that do not line up accurately between the two models, step 76. This step is needed to assure that any slot shift which may occur during the computer flattening process is taken into account, step 78. If there is a shifting of any of the slots, such that the match is not within tolerances, the slots in the 2D model are modified to account for the shift, step 80. Steps 74 to 78 are then repeated, and the iterating continues until the slots are all within tolerance. Once within tolerance, tooling for the progressive dies can be made based upon the final 2D pattern generated, step 82, in a conventional manner. A piercing die is fabricated for station 2 (shown in FIG. 4) based upon the two dimensional pattern, in order to pierce the slots.

Figure 3:
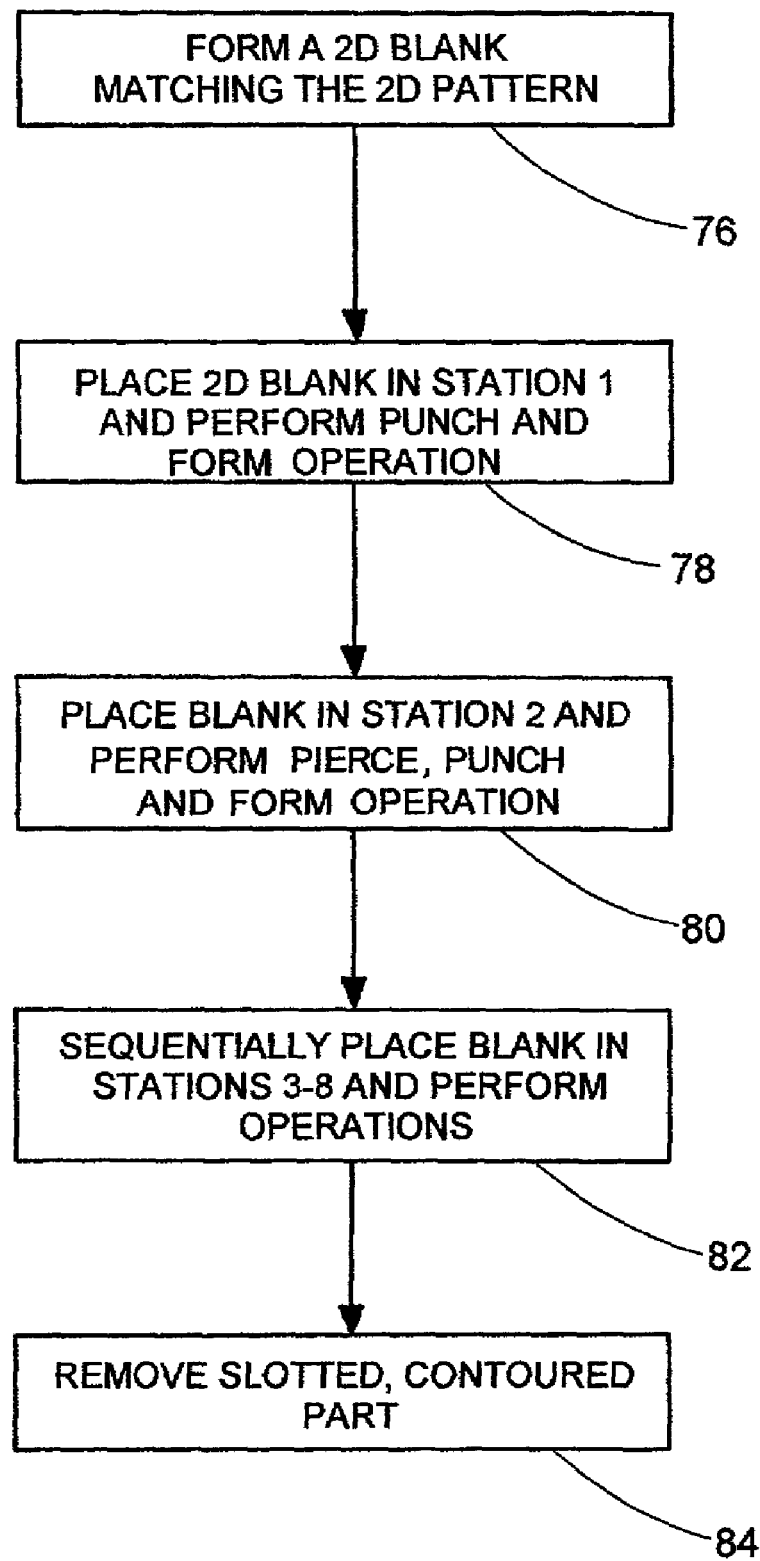
FIG. 3 is a is a flow chart indicating the forming process in accordance with the present invention.

FIGS. 3 and 4 illustrate the process for forming the contoured part with the slots, once the accurate 2D pattern for a blank has been generated and the progressive die tooling is fabricated. FIG. 3 is a flow chart and FIG. 4 is a schematic view of a series of die stations in a progressive die tool 18" that will create both the contours and the slots in the part as it progresses through the tool. Elements in FIG. 4 similar to those in FIG. 5 will be identified with the same element numbers, but with a prime.

Blanks 19" are made in the shape of the 2D pattern, for the particular torque converter part being formed, step 76. One of the blanks is placed in the first die 20" at Station 1, and a punch and form operation is performed, step 78. The blank 19" progresses to the second die 21" at Station 2 of the progressive dies 20", where a punch and form operation is performed, as in the prior art, but also a piercing operation is performed to pierce slots 79, step 80. Of course, the dies at station 1 and 2 can be modified so that the slots are pierced at the first station, since the blank is still essentially planar after it leaves either station.

Stations 3–8 employ the same dies and perform the same operations as described above in relation to the prior art process for forming the torque converter part, step 82, but with the slots already in the blank 19" as it progresses through. The finished part is removed from die 83 at station 8, step 84. The end result, then, is a fully contoured part with the slots accurately formed in the part. Consequently, the manufacturing method of the current invention allows for the elimination of an entire operation and its associated machinery and dies, while maintaining much of the progressive stamping dies as they were prior to the elimination of the separate slotting operation. Further, this process allows for all of the slots to be formed in one operation, which allows one to maintain accuracy in the slot locations and shape.

While certain embodiments of the present invention have been described in detail, those familiar with the art to which this invention relates will recognize various alternative designs and embodiments for practicing the invention as defined by the following claims.

The invention claimed is:

1. A method for creating a two dimensional pattern that can be used to create a three dimensional part with complex contours, and slots, having predetermined shapes and locations on the part, the method comprising the steps of:
   (a) creating a first three dimensional computer model of the part including the contours and the slots;
   (b) creating a generally two dimensional computer model of the part by inputting the first three dimensional computer model into a stamping tool software;
   (c) creating a second three dimensional computer model of the part by inputting the generally two dimensional computer model into a transfer die software;
   (d) comparing at least one of the slot shapes and locations of the first three dimensional computer model to the second three dimensional computer model;
   (e) modifying the at least one of the slot shapes and locations in the generally two dimensional computer model if the comparison indicates differences between the compared at least one slot; and
   (f) repeating steps (c) through (e) until the comparison indicates substantially the same slot shapes and locations for the at least one slot in the first three dimensional computer model and the second three dimensional computer model.

2. The method of claim 1 further comprising the step of (g) fabricating progressive die tooling for forming the part from a blank sized and shaped to match the generally two dimensional computer model.

3. The method of claim 2 wherein step (g) includes the steps of fabricating a first progressive die station adapted for forming at least one of a contour and a hole in the blank, fabricating a second progressive die station adapted for at least creating slots in the blank, and fabricating a third progressive die station adapted for forming at least an additional contour in the blank.

4. The method of claim 3 further comprising the steps of:
   forming the blank, sized and shaped to match the generally two dimensional computer model;
   placing the blank in the first progressive die station and forming at least one of a contour and a hole in the blank;
   progressing the blank to the second progressive die station and piercing slots therein; and
   progressing the blank to the third progressive die station and forming an additional contour therein.

5. The method of claim 1 wherein step (b) includes inputting the first three dimensional computer model into a I-DEAS software program.

6. The method of claim 1 wherein step (c) includes inputting the generally two dimensional computer model into a PAMSTAMP software program.

* * * * *